US007164252B1

(12) United States Patent
Myers et al.

(10) Patent No.: US 7,164,252 B1

(45) Date of Patent: Jan. 16, 2007

(54) ELECTRICALLY POWERED HAND TOOL

(75) Inventors: Kurt S. Myers, Idaho Falls, ID (US); Teddy R. Reed, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 11/193,732

(22) Filed: Jul. 29, 2005

(51) Int. Cl.
*H02P 27/04* (2006.01)
*H02P 25/00* (2006.01)

(52) U.S. Cl. ...................... 318/800; 318/727; 318/821; 388/937; 29/560

(58) Field of Classification Search ................ 318/727, 318/821, 800; 388/DIG. 2, 937; 323/355; 363/36; 29/560

See application file for complete search history.

(56) References Cited

U.S. PATENT DOCUMENTS

| | | | | |
|---|---|---|---|---|
| 3,559,751 | A | 2/1971 | Yamada | |
| 4,349,074 | A | 9/1982 | Ince | |
| 4,750,567 | A | 6/1988 | Grossmann et al. | |
| 4,779,327 | A * | 10/1988 | Vander Maas | 29/560 |
| 4,823,886 | A | 4/1989 | Pyatov | |
| 4,849,871 | A * | 7/1989 | Wallingford | 363/41 |
| 5,111,890 | A | 5/1992 | Ranger et al. | |
| 5,435,397 | A | 7/1995 | Demuth | |
| 5,456,324 | A | 10/1995 | Takagi et al. | |
| 5,640,314 | A * | 6/1997 | Glasband et al. | 363/36 |
| 5,757,162 | A * | 5/1998 | Weber | 318/821 |
| 5,775,440 | A | 7/1998 | Shinma | |
| 5,873,418 | A | 2/1999 | Arakawa et al. | |
| 5,892,667 | A * | 4/1999 | Glasband et al. | 363/36 |
| 6,060,876 | A * | 5/2000 | Glasband et al. | 323/355 |
| 6,116,352 | A | 9/2000 | Frauhammer et al. | |
| 6,457,535 | B1 | 10/2002 | Tanaka | |
| 6,600,289 | B1 * | 7/2003 | George et al. | 318/727 |
| 2002/0180400 | A1 * | 12/2002 | George et al. | 318/727 |
| 2003/0215564 | A1 * | 11/2003 | Heller et al. | 427/2.25 |

OTHER PUBLICATIONS

Bosch Product Encyclopedia, www.boschtools.com, Oct. 1, 2003, pp. 1 and 2.

* cited by examiner

*Primary Examiner*—Paul Ip
(74) *Attorney, Agent, or Firm*—Wells St. John P.S.

(57) ABSTRACT

An electrically powered hand tool is described and which includes a three phase electrical motor having a plurality of poles; an electrical motor drive electrically coupled with the three phase electrical motor; and a source of electrical power which is converted to greater than about 208 volts three-phase and which is electrically coupled with the electrical motor drive.

1 Claim, 2 Drawing Sheets

ELECTRICALLY POWERED HAND TOOL

GOVERNMENT RIGHTS

This invention was made with Government support under Contract DE-AC07-05ID14517 awarded by the U.S. Department of Energy. The Government has certain rights in the invention.

TECHNICAL FIELD

The present invention relates to an electrically powered hand tool, and more specifically to a high powered hand tool which includes a three phase electrical motor, an electrical motor drive coupled with the three phase electrical motor, and a source of electrical power which is converted to greater than or equal to 208 volts three-phase and which is electrically coupled with the electrical motor drive.

BACKGROUND OF THE INVENTION

The prior art is replete with numerous examples of rotary hammer driving mechanisms and hammer drill arrangements and which are useful in construction and mining applications. Further, high powered, air powered jack hammers have been in use for decades. While these various devices have operated with various degrees of success they have had shortcomings which have detracted from their usefulness. Among the chief problems associated with these prior art assemblies is that they are very energy inefficient. It has been calculated, that for example, compressed air hammer-drills utilize only on the order of about 20% of the available energy delivered by the compressed air. This inefficiency results in significant power costs. Additionally, distributing large quantities of compressed air to work locations such as in a mine, or other similar environments, can require the fabrication of large complex and expensive air piping systems. Further, in view of the energy losses, as discussed above, when a compressed air tool, such as a jack hammer is employed, unduly large air compressors must be utilized. Additionally, the prior art electrically-powered tool designs, as a general matter, have often been large, bulky, and not conducive to hand-held operations. Moreover, the large size of these compressed air tools often restricts their use in some close working environments because of space restrictions.

Therefore, a new electrically powered hand tool which addresses these and other shortcomings in the prior art devices and practices is the subject matter of the present application.

SUMMARY OF THE INVENTION

Therefore, a first aspect of the present invention relates to an electrically powered hand tool which includes a three phase electrical motor having a plurality of poles; an electrical motor drive electrically coupled with the three phase electrical motor; and a source of electrical power which is converted to greater than or equal to about 208 volts three-phase, and which is electrically coupled with the electrical motor drive.

Still another aspect of the present invention relates to an electrically powered hand tool which includes a three phase electrical motor which, when energized, operates at a speed of less than about 22,000 RPM, and wherein the three phase electrical motor has a mechanical power output; a gear arrangement made integral with the electrically powered hand tool, and which is coupled to the mechanical power output of the three phase electrical motor; a work implement which is mechanically coupled with the gear arrangement, and which has an optimal speed of operation, and wherein the gear arrangement causes the work implement to operate at the optimal speed when the three phase electrical motor is energized; an electrical motor drive electrically coupled with the three phase electrical motor, and which supplies three phase electrical power of about 0 to about 2,000 Hz, and greater than about 208 volts; and a source of three phase electrical power which is at least about 50 Hz and 208 volts, and which is electrically coupled to the electrical motor drive.

Further, another aspect of the present invention relates to an electrically powered hand tool which includes a three phase electrical motor having no more than 12 poles and which, when energized, has a mechanical power output of greater than about 2.5 Hp and less than about 10 Hp, and a speed of operation of less than about 22,000 RPM; a gear arrangement which mechanically cooperates with the three phase electrical motor, and which receives the mechanical power output of the three phase electrical motor; a work implement which mechanically cooperates with the gear arrangement, and which cyclically operates at an optimal operational speed; an electrical motor drive which is electrically coupled with the three phase electrical motor and which supplies the three phase electrical motor with at least about 0 to about 2,000 Hz and 208 volts of electrical power to energize the three phase electrical motor; an electrical power converter which is operable to supply a power output of at least about 50 Hz and 208 volts of electrical power, and which is supplied to the electrical motor drive; and a source of single and/or three phase electrical power of at least about 50 Hz, and about 100 to about 600 volts, and which is supplied to the electrical power converter.

These and other aspects of the present invention will be discussed in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
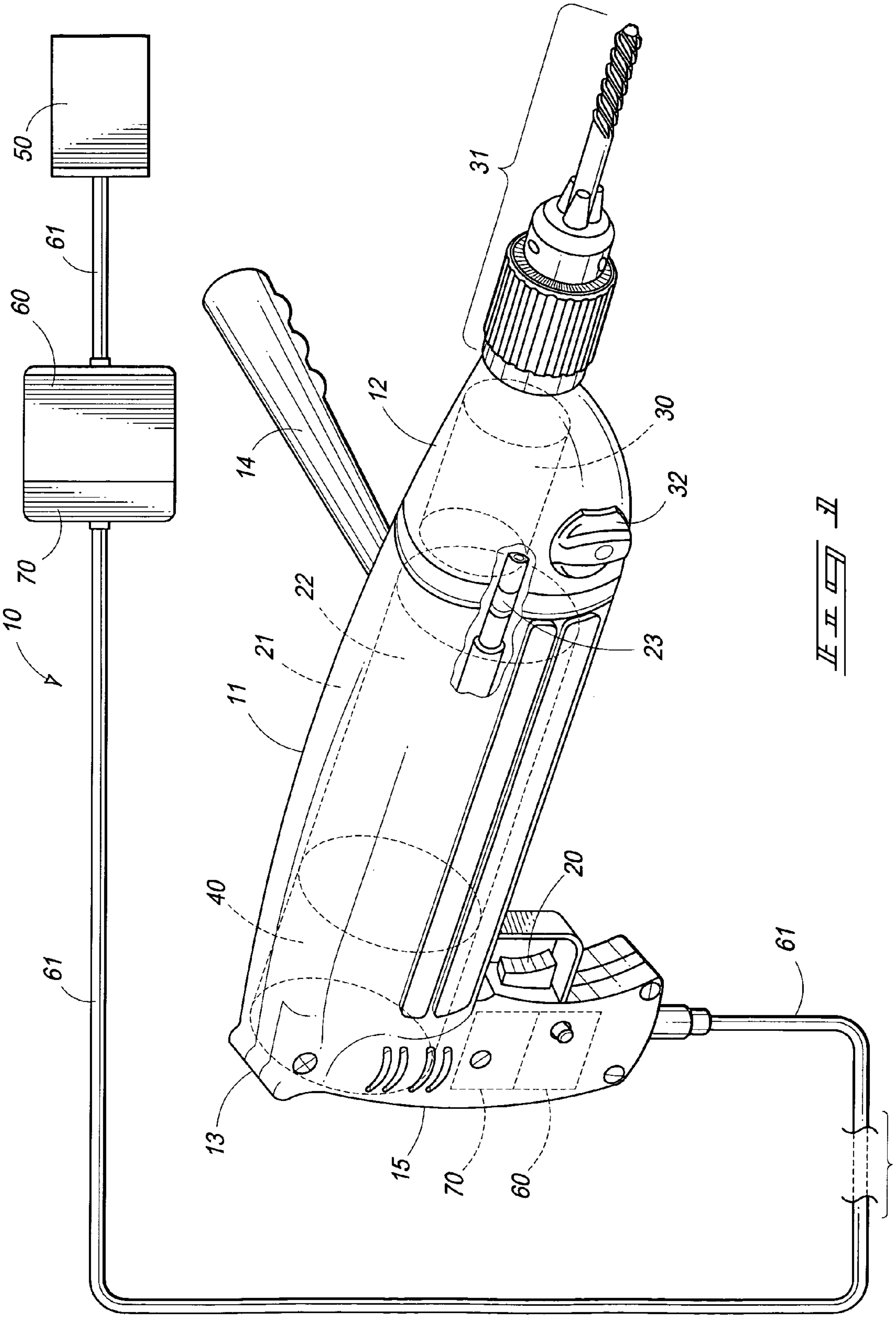
FIG. 1 is a simplified view of an electrically powered hand tool which incorporates the features of the present invention.
Figure 2:
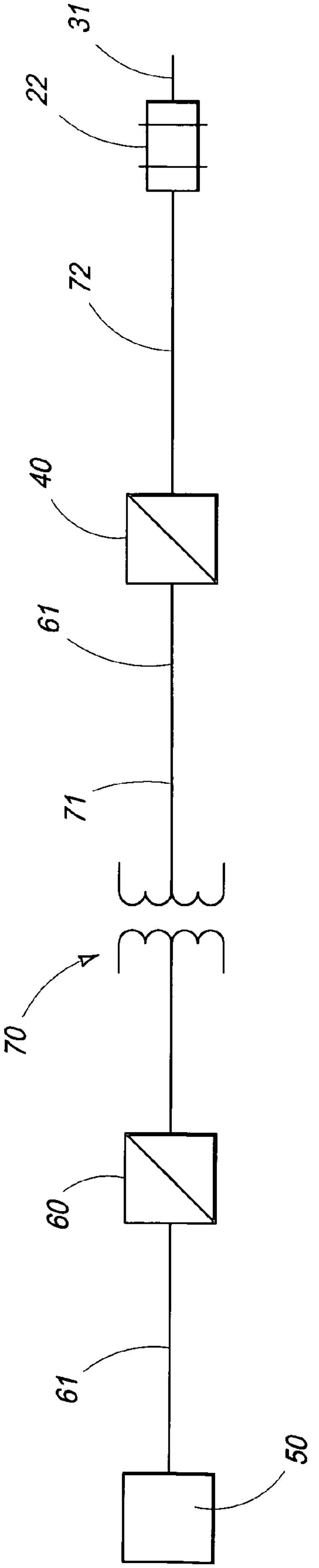
FIG. 2 is a greatly simplified electrical schematic view of the present invention.

Referring now to FIGS. 1 and 2, an electrically powered hand tool is generally designated by the numeral 10. As seen in FIG. 1, the electrically powered hand tool 10 includes an exterior housing 11 which has a first end 12 and an opposite second end 13. Positioned therebetween the first and second ends 12 and 13 is a first operator's handle 14. Still further, mounted adjacent to the second end is a second operator's handle 15. Positioned adjacent to the second operator's handle 15 is a finger actuated trigger 20 which may be manipulated by an operator in order to operate the electrically powered hand tool 10. The exterior housing 11 defines an interior housing cavity 21 which receives, among other assemblies, a three phase electrical motor 22. One type of acceptable electrical motor is a squirrel-cage induction type motor. The three phase electrical motor has a mechanical power output, when energized, of about 2.5 to less than about 10 horsepower and has a weight typically of less than about 20 pounds. The three phase electrical motor has no more than 12 poles, and a length dimension of less than about 8 inches, and an outside diametral dimension of less than about 6¼ inches. Still further, the electrical motor, when energized, has a speed of operation of typically less than about 22,000 rpm. As seen in FIG. 1, the electrical motor 22 has an output drive shaft generally indicated by the numeral 23. The function of this drive shaft will be discussed below.

As seen in FIG. 1, the present invention 10 includes a gear arrangement which is generally indicated by the numeral 30. The gear arrangement mechanically cooperates with and is disposed in force receiving relation relative to the three phase electrical motor 22 by means of the output drive shaft 23. This gear arrangement is well known in the art. The gear arrangement is operable to receive the mechanical output of the three phase electrical motor 22 and further imparts that mechanical power output to a work implement 31 which mechanically cooperates with the gear arrangement. The work implement 31 as seen comprises a chuck and an associated drill and which cyclically operates at an optimal operational speed. As should be appreciated, the work implement may be any number of different designs including reciprocally moveable work implements. A selector switch 32 is provided and which allows an operator to change the speed of operation of work implement.

As further seen in FIG. 1, an electrical motor drive is provided, and which is generally indicated by the numeral 40. The electrical motor drive is positioned within the housing 11, and which is electrically coupled with the three phase electrical motor 22. The electrical motor drive 40 supplies the three phase electrical motor with at least about 0 to about 2,000 Hz. and 208 volts of electrical power to energize the three phase electrical motor 22. As should be appreciated, and while the electrical motor drive is shown as being made integral with the electrically powered hand tool 10, it is also possible to position the electrical motor drive remotely relative to the housing in the event that there are space constraints within the housing, or further, to reduce the weight of the electrically powered hand tool 10. As discussed above, a selector switch 32 is provided on the housing 11 and which is operable to mechanically cooperate with the gear arrangement 30. The selector switch allows an operator (not shown) to select various cyclical or operational speeds for the work implement 31.

Referring still to FIG. 1, a source of electrical power 50 is generally shown, and which is supplied or otherwise electrically coupled to the electrically powered hand tool 10 so as to energize same. The source of electrical power may comprise, for example, single phase electrical power; or 480 volt three phase electrical power. For purposes of the present application, the electrical power will be discussed in terms of single phase electrical power. It will be understood, from the discussion which follows, that some of the further assemblies as described hereinafter may not be required in the event that, for example, 50 or 60 Hz, 480 volt three phase electrical power is readily available. As will become apparent from the discussion which follows, the invention can be used with a wide range of power sources such as 50 or 60 Hz, 240 volt single phase electrical power. However, the invention can be readily adapted to use power sources in the range of 100 to about 600 volts. As seen in FIG. 2, it should be understood that the electrically powered hand tool 10 and more specifically the electrical motor drive 40 must be supplied with a source of three phase electrical power of about 0–2000 Hz and greater than about 208 volts in order to render the electrically powered hand tool operational.

In the arrangement as seen in FIGS. 1 and 2, and assuming that the source of electrical power 50 is a single phase power source, as described above, then the present invention 10 further includes an electrical power converter 60 for converting the source of single phase electrical power such as provided at 50, at least in part, into the source of three phase electrical power which is greater than about 208 volts. As should be understood, in the event that three phase electrical power of greater than about 208 volts is readily available, then an electrical power converter 60, would not be required. As seen in FIG. 1, it will be appreciated that the electrical power converter, in some arrangements, may be made integral with the electrically powered hand tool 10 (as shown in phantom lines) or on the other hand, positioned remotely relative to the housing 11, as illustrated. The remote positioning of the converter 60 permits the electrically powered hand tool to have less weight, and make it easier to handle. As illustrated in FIG. 1, an electrical conduit 61 electrically couples the electrical power converter 60 with the electrically powered hand tool 10 and the source of electrical power 50.

Depending upon the source of electrical power 50 which is supplied, and the design of the power converter 60, the present invention 10 may further include an electrical power transformer 70 which is electrically coupled to the electrical power converter 60, and which is further electrically coupled with the electric motor drive 40. The electrical power transformer is operable to electrically increase or decrease the voltage of the three phase electrical power provided by the electrical power converter 60 to produce a three phase electrical power output which is greater than about 208 volts 71 (FIG. 2) and which is supplied to the electrical motor drive. The three phase electrical power 71 which is supplied to the three phase electrical motor drive 40 is greater than about 50 Hz and greater than 208 volts. As seen in FIG. 2, the three phase electrical motor drive 40 supplies electrical power 72 to the three phase electrical motor 22 in a range of about 0 to about 2,000 Hz, and at least about 208 volts. In the arrangement as seen in FIG. 1, the electrical power transformer 70 may be made integral with the electrical power converter 60 as illustrated, or further and, in the alternative, the same transformer 70 may be made integral with the housing 11 of the invention 10 (as seen in phantom lines). As discussed, above, with respect to the electrical power converter 60, the positioning of the electrical transformer 70 remotely relative to the electrically powered hand tool 10 has the effect of reducing the weight of the same hand tool thereby making it more useful in the hands of an operator (not shown). In the arrangement as illustrated, the electrical motor drive 40 may be selected from the group comprising a power electronics converter; variable speed and/or frequency electrical motor drive; and a non-variable frequency converter electrical motor drive. As should be understood, and based upon the source of electrical power 50, the electrical power converter 60 and associated transformer 70 may be completely eliminated in the event that a source of three phase electrical power of 208 volts and greater than about 50 Hz is readily available and can be supplied to the electrical motor drive 40.

OPERATION

The operation of the described embodiment of the present invention is believed to be readily apparent and is briefly summarized at this point.

Referring to FIGS. 1 and 2, an electrically powered hand tool 10 is shown and which includes a three phase electrical motor 22 having a plurality of poles. The electrically powered hand tool 10 further includes an electrical motor drive 40 which is electrically coupled with the three phase electrical motor 22; and a source of three phase electrical power 71 which is greater than about 208 volts, and which is electrically coupled with the electrical motor drive. In the arrangement as seen, the three phase electrical motor 22, when energized, has a mechanical power output of about 2.5 to less than about 10 Hp, and a speed of operation of less than about 22,000 RPM.

More specifically, the present invention which is directed to an electrically powered hand tool 10 includes a three phase electrical motor 22 having no more than 12 poles and which, when energized, has a mechanical power output of about 2.5 Hp and less than about 10 Hp, and a speed of operation of less than about 22,000 RPM. Still further, a gear arrangement 30 is provided and which mechanically cooperates with the three phase electrical motor 22, and which receives the mechanical power output of the three phase electrical motor. Still further, a work implement 31 is provided and which mechanically cooperates with the gear arrangement 30, and which cyclically operates at an optimal operational speed. Still further, the invention includes an electrical motor drive 40 which is electrically coupled with the three phase electrical motor 22 and which supplies the three phase electrical motor with at least about 0 to about 2,000 Hz and 208 volts of electrical power to energize the three phase electrical motor. Still further, and in some arrangements, an electrical power converter 60 is provided, and which is operable to supply a power output of greater than about 50 Hz and 208 volts of electrical power, and which is supplied to the electrical motor drive. Finally, the present invention may include a source of single and/or three phase electrical power 50 of at least about 50 Hz and about 100 to about 600 volts, and which is supplied to the electrical power converter.

Therefore, it will be seen that the electrically powered hand tool 10 of the present invention provides numerous advantages over the prior art assemblies utilized heretofore including the elimination of weight by the utilization of a three phase electrical motor 22, and the remote positioning of various components such as the power converter 60, transformer 70, and motor drive 40. Still further, the present invention provides a greater degree of flexibility by allowing the electrically powered hand tool to be energized by a wide range of electrical power sources which then may be treated by the electrical power converter 60 and/or transformer 70 in order to provide the appropriate amount of power for energizing the invention 10.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An electrically powered hand tool, comprising:

a housing which is hand-carried by an operator during the operation thereof, and wherein the housing has a first end, and an opposite second end which defines an operator's handle, and further defines an interior housing cavity;

a three-phase squirrel cage induction motor enclosed within the interior housing cavity of the housing, and wherein the three-phase induction motor has no more than 12 poles, a length dimension of less than about 8 inches, a speed of operation when energized of less than about 22,000 RPM, a weight of less than 20 pounds, and about 2.5 to less than about 10 horsepower;

a trigger borne by the operator's handle and which selectively energizes the three-phase squirrel cage induction motor;

an output drive shaft enclosed within the interior housing cavity, and which is oriented in force receiving relation relative to the three-phase squirrel cage induction motor;

a gear arrangement located in the interior housing cavity and near the first end of the housing, and wherein the gear arrangement is coupled in force receiving relation relative to the output drive shaft;

a work implement moveably mounted on the first end of the housing and which is coupled in force receiving relation relative to the gear arrangement;

an electric motor drive located within the interior housing cavity and electrically coupled with the three-phase squirrel cage induction motor, and wherein the electric motor drive supplies less than about 2000 Hz., and greater than about 208 volts of electrical power to the three-phase squirrel cage induction motor;

a source of electrical power for energizing the electrically powered hand tool; and a power converter and/or a power transformer which are attached, and positioned remotely relative to the housing, and which receive the source of electrical power and subsequently converts the source of electrical power into three-phase, less than about 2000 Hz., and greater than about 208 volts which is then supplied to the electric motor drive for energizing the three-phase squirrel cage induction motor.

* * * * *